(12) United States Patent
Glazebrook

(10) Patent No.: US 8,163,209 B2
(45) Date of Patent: Apr. 24, 2012

(54) METHOD AND APPARATUS FOR CONTROLLING THE GEOMETRY OF A COMPOSITE COMPONENT

(75) Inventor: Christopher Glazebrook, Bristol (GB)

(73) Assignee: Airbus Operations Limited, Bristol (GB)

( * ) Notice: Subject to any disclaimer, the term of this patent is extended or adjusted under 35 U.S.C. 154(b) by 50 days.

(21) Appl. No.: 12/312,148

(22) PCT Filed: Nov. 12, 2007

(86) PCT No.: PCT/GB2007/050684
§ 371 (c)(1),
(2), (4) Date: Apr. 28, 2009

(87) PCT Pub. No.: WO2008/059286
PCT Pub. Date: May 22, 2008

(65) Prior Publication Data
US 2010/0044899 A1    Feb. 25, 2010

(30) Foreign Application Priority Data
Nov. 14, 2006   (GB) .................................. 0622691.4

(51) Int. Cl.
*B29C 43/02* (2006.01)
*B29C 45/80* (2006.01)
*B29C 70/48* (2006.01)

(52) U.S. Cl. ....... 264/40.5; 264/571; 264/257; 264/511; 425/149; 425/389; 425/150

(58) Field of Classification Search ................. 264/40.5, 264/40.6, 136, 137, 257, 511, 571; 425/149, 425/500, 150, 389
See application file for complete search history.

(56) References Cited

U.S. PATENT DOCUMENTS

| | | | | |
|---|---|---|---|---|
| 3,132,472 A * | 5/1964 | Schweitzer | ...................... | 60/531 |
| 3,746,589 A * | 7/1973 | Reinke | ........................ | 156/73.1 |
| 4,458,189 A * | 7/1984 | Dollerschell | ................ | 318/591 |
| 5,015,168 A * | 5/1991 | Boime et al. | .................. | 425/389 |
| 5,601,852 A * | 2/1997 | Seemann | ....................... | 425/112 |
| 6,164,408 A * | 12/2000 | Lamm et al. | ..................... | 181/30 |
| 6,644,954 B2 | 11/2003 | Sloman | | |
| 6,815,047 B1 * | 11/2004 | Kitayama et al. | .......... | 428/314.8 |
| 6,818,159 B2 * | 11/2004 | Hinz | .............................. | 264/40.6 |
| 7,413,695 B2 * | 8/2008 | Thrash et al. | ................. | 264/257 |
| 7,553,435 B2 * | 6/2009 | McCollum | ................... | 264/40.5 |

(Continued)

FOREIGN PATENT DOCUMENTS
DE    20 2004 001 070    6/2004

(Continued)

OTHER PUBLICATIONS
International Search Report for PCT/GB2007/050684 mailed Apr. 7, 2008.

(Continued)

Primary Examiner — Joseph Del Sole
Assistant Examiner — Nahida Sultana
(74) Attorney, Agent, or Firm — Nixon & Vanderhye P.C.

(57) ABSTRACT

A method of controlling the geometry of a composite component (3). The method comprises applying pressure to the component with a pressure transmitter (6), and during said application of pressure: heating the component; measuring the position of the pressure transmitter to produce a feedback signal; and moving the pressure transmitter in response to a change in the feedback signal.

16 Claims, 8 Drawing Sheets

U.S. PATENT DOCUMENTS

| | | | |
|---|---|---|---|
| 2003/0031383 A1* | 2/2003 | Gooch | 382/291 |
| 2003/0042633 A1* | 3/2003 | Foreman et al. | 264/1.36 |
| 2003/0227107 A1* | 12/2003 | Stewart | 264/236 |
| 2004/0051214 A1* | 3/2004 | Sheu et al. | 264/511 |
| 2005/0069600 A1* | 3/2005 | Scolamiero et al. | 425/149 |
| 2005/0184416 A1* | 8/2005 | McCollum | 264/40.5 |
| 2006/0119669 A1* | 6/2006 | Sharma et al. | 347/82 |
| 2007/0090126 A1* | 4/2007 | Tanaka et al. | 222/23 |
| 2007/0152379 A1* | 7/2007 | Jacobson | 264/500 |
| 2008/0251956 A1* | 10/2008 | Korhonen et al. | 264/1.9 |
| 2008/0292738 A1* | 11/2008 | Cude | 425/150 |
| 2009/0220629 A1* | 9/2009 | Narasimalu et al. | 425/149 |

FOREIGN PATENT DOCUMENTS

| | | |
|---|---|---|
| DE | 103 47 879 | 7/2005 |
| EP | 0 599 037 | 6/1994 |
| JP | 56 166020 | 12/1981 |
| WO | WO 02/23126 | 3/2002 |
| WO | WO 2006/016005 A1 * | 2/2006 |
| WO | WO 2007/123249 A2 * | 11/2007 |

OTHER PUBLICATIONS

Written Opinion of the International Search Authority for PCT/GB2007/050684 mailed Apr. 7, 2008.
Search Report for GB 0622691.4 mailed Jan. 31, 2007.

* cited by examiner

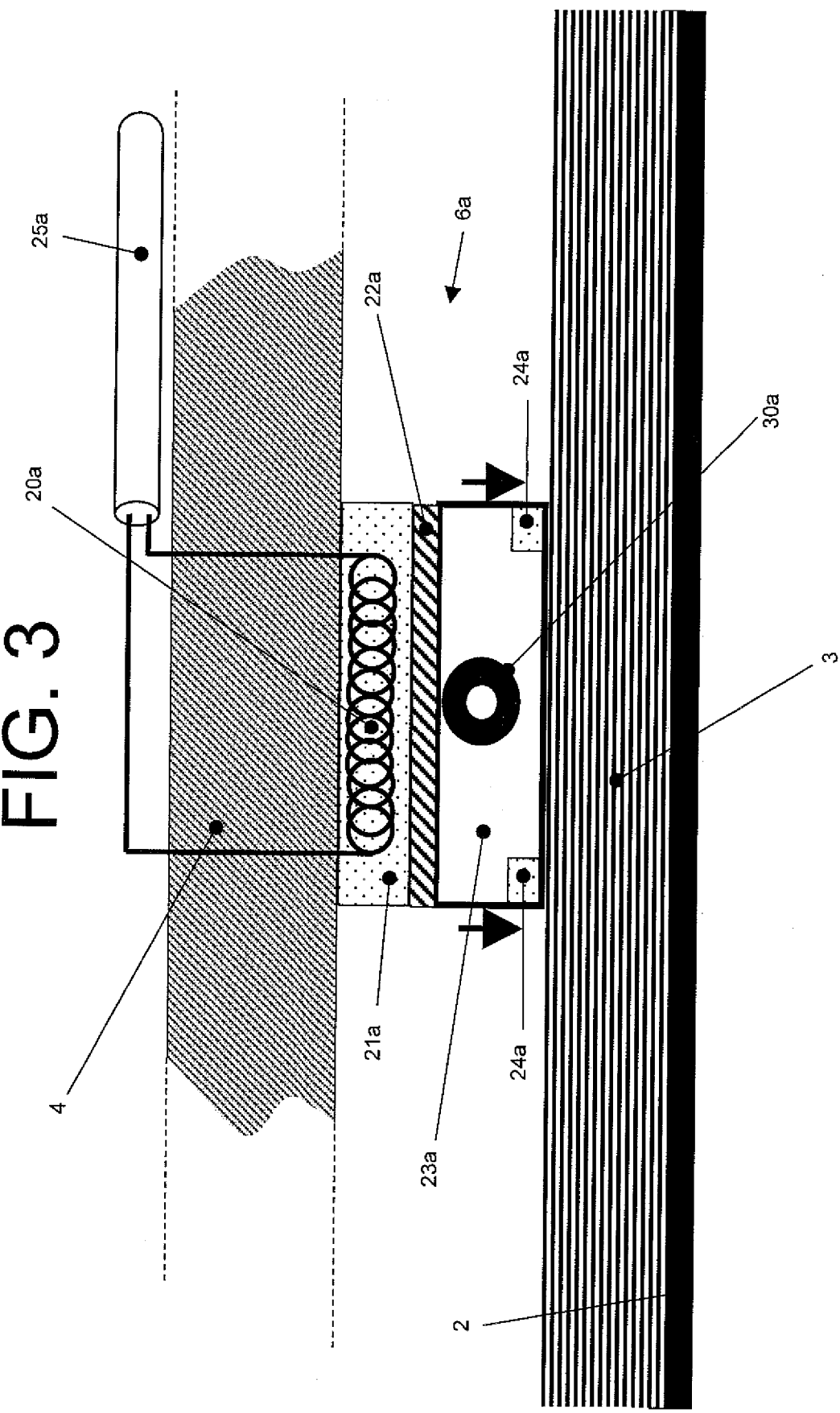

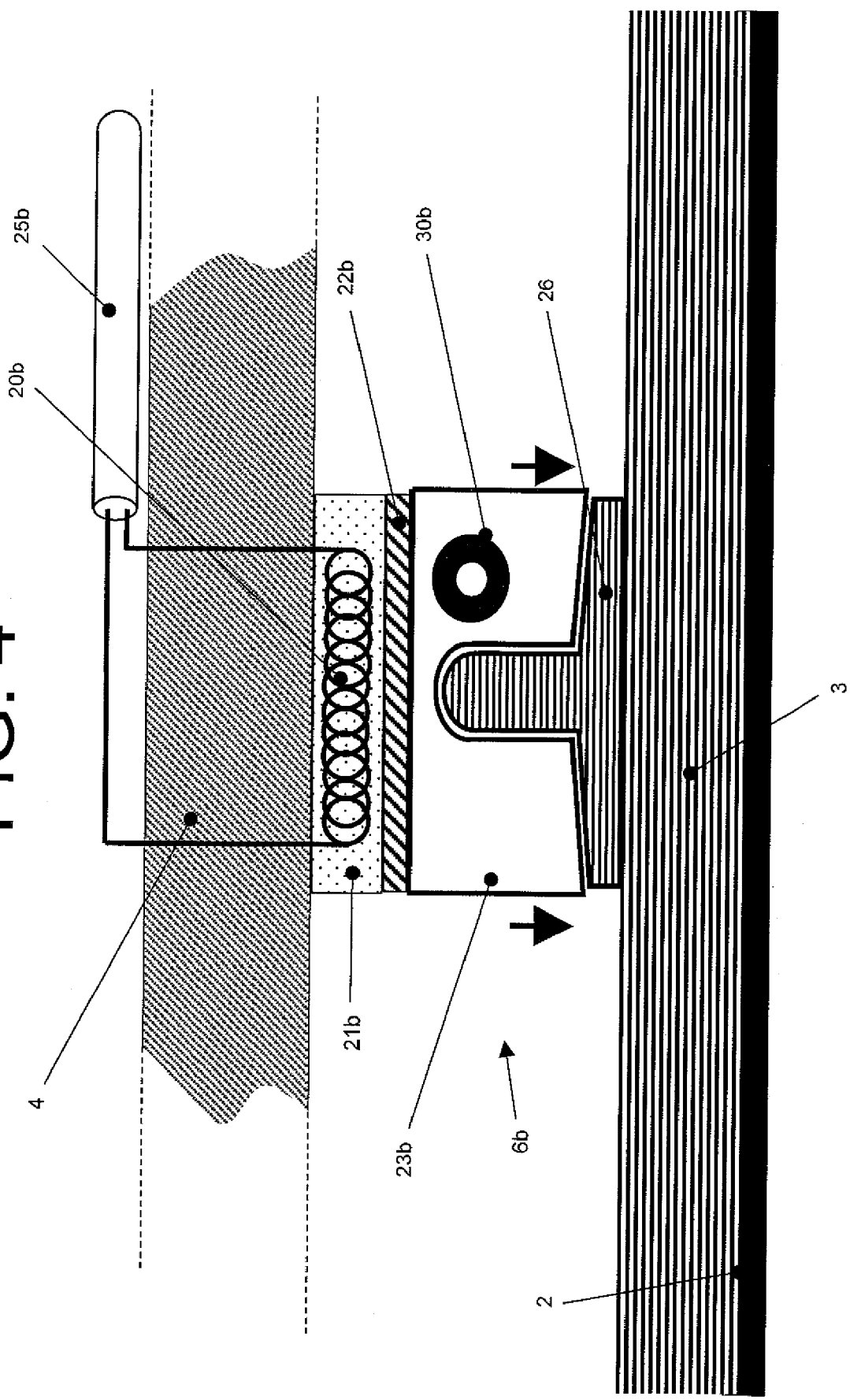

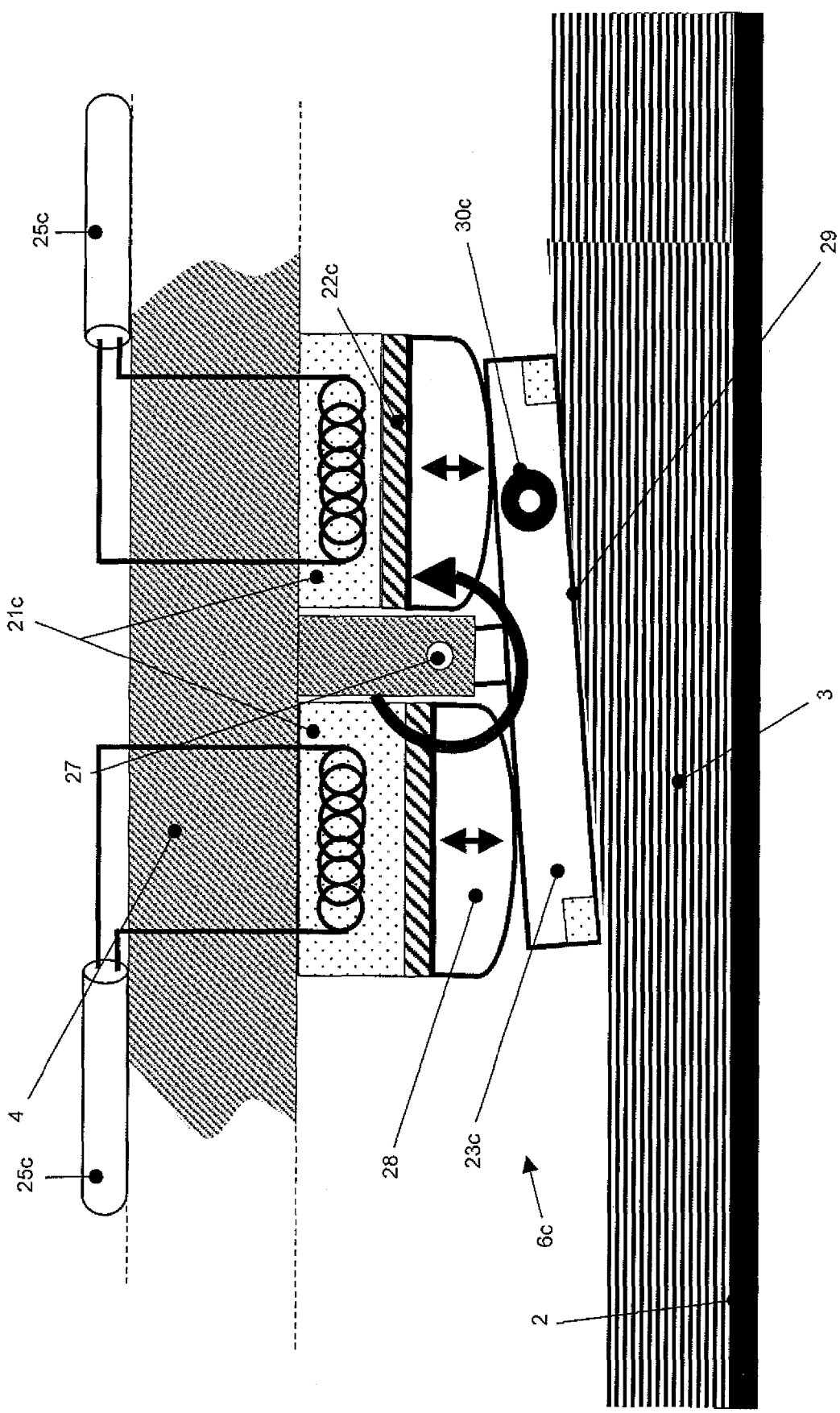

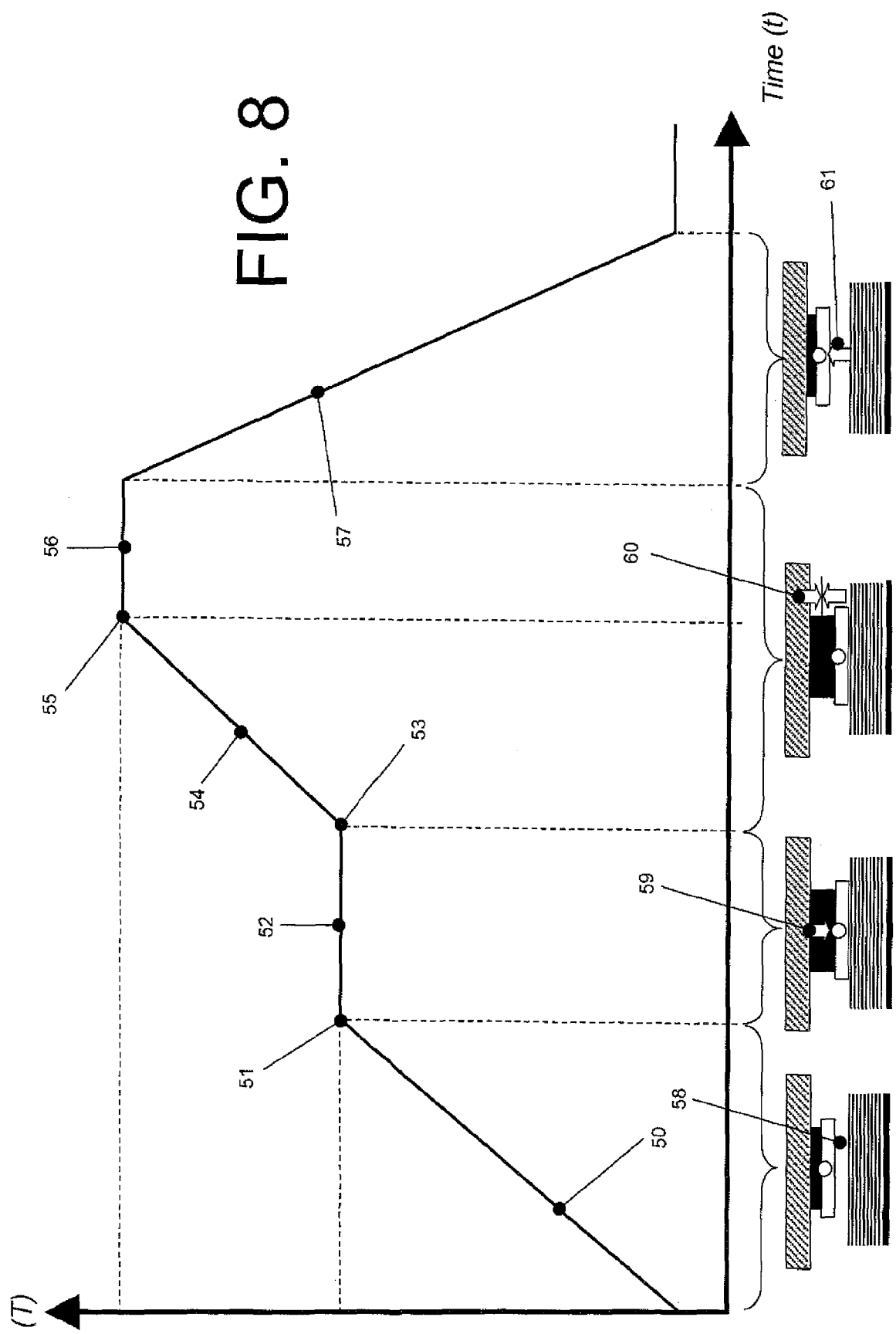

METHOD AND APPARATUS FOR CONTROLLING THE GEOMETRY OF A COMPOSITE COMPONENT

This application is the U.S. national phase of International Application No. PCT/GB2007/050684 filed 12 Nov. 2007 which designated the U.S. and claims priority to British Patent Application No. 0622691.4 filed 14 Nov. 2006, the entire contents of each of which are hereby incorporated by reference.

FIELD OF THE INVENTION

The present invention relates to a method and apparatus for controlling the geometry of a composite component.

BACKGROUND OF THE INVENTION

Relatively precise control of the geometry of a composite component can be achieved by using a resin transfer moulding (RTM) process. A dry reinforcement preform is laid up on a mould tool, a second mould tool is clamped over the first, and resin is injected into the cavity. The spacing between the mould tools (and hence the thickness of the component) can be controlled by mutual engagement between the mould tools around the edge of the component. Unfortunately such mould tools can be expensive to manufacture and handle, particularly where the component is a large component such as an aircraft wing or fuselage skin panel.

Lower cost methods are available which require only a single mould tool. However in these cases it is difficult to accurately control the geometry of the component.

SUMMARY OF THE INVENTION

A first aspect of the invention provides a method of controlling the geometry of a composite component, the method comprising applying pressure to the component with a pressure transmitter, and during said application of pressure:
heating the component;
measuring the position of the pressure transmitter to produce a feedback signal; and
moving the pressure transmitter in response to a change in the feedback signal.

A second aspect of the invention provides apparatus for controlling the geometry of a composite component, the apparatus comprising a pressure transmitter; a sensor system configured to measure a position of the pressure transmitter to produce a feedback signal; and an actuator coupled to the sensor system and configured to move the pressure transmitter in response to a change in the feedback signal.

The component may be a thermoplastic component, or a thermosetting component which is cured at least partially by heating the component. The component is typically, although not exclusively, an aircraft component. For instance the component may be a wing or fuselage skin panel, or a spar or rib component. Typically the component has a laminar structure.

The sensor system may employ a variety of methods to measure the position of the pressure transmitter. For instance the sensor system may be an LVDT displacement transducer comprising a set of coils which measure the position of a magnetic armature. Alternatively the sensor system may employ laser sighting. However a problem with laser sighting is that changes in the laser beam wavelength may be induced by the turbulent heated atmosphere surrounding the component. Therefore preferably the feedback signal is produced by taking photographic images of the pressure transmitter from two or more different angles, and processing the images. Typically the processing step includes identifying images of one or more targets on the pressure transmitter—such targets being integral parts of the pressure transmitter or applied to the pressure transmitter for instance by an adhesive.

Typically the component is engaged with a mould tool; and the sensor system measures the relative position between the mould tool and the pressure transmitter to produce the feedback signal.

The sensor system may measure the position of the pressure transmitter relative to a variety of datum reference points. For instance the datum reference point may be a point on the sensor itself, an initial position of the pressure transmitter, or a point on some external structure. However, preferably the system measures the position of the pressure transmitter relative to one or more datum reference points on the mould tool, thus giving a relatively accurate measurement of the relative position between the mould tool and the pressure transmitter.

In an extreme example, only a single pressure transmitter may be used. In this case the pressure transmitter typically has a smaller contact area than the mould tool. However preferably a number of such pressure transmitters are used, each being controlled independently.

Typically the pressure intensifier supplements hydrostatic pressure applied by laying a vacuum bag onto the component, and evacuating one side of the vacuum bag. The pressure intensifier may apply pressure to the component via the vacuum bag, or may engage the component directly.

A variety of actuators may be used, including hydraulic, pneumatic and electric actuators. Such actuators may employ a linear motor which converts a rotary motion into a linear motion via a helical screw. Where pneumatic actuators are used, then preferably they use Nitrogen as a pneumatic drive medium, since the process is typically performed in a Nitrogen rich atmosphere. However preferably a thermal actuator is used to move the pressure transmitter by heating the pressure transmitter. Such a thermal actuator can accurately control small changes in position and has relatively few moving parts.

The pressure transmitter may be rotated and/or moved along a substantially straight path in response to a change in the feedback signal.

Typically the component is a fibre-reinforced composite component.

The component may be a stack of so-called "prepregs": layers of reinforcement material pre-impregnated with epoxy resin matrix. However, such prepregs can be expensive, so more preferably the component comprises a stack of layers of reinforcement material, optionally interleaved with matrix films which melt and infuse the layers of reinforcement material as the component is heated.

The component may be injected with a liquid matrix during an infusion phase, and preferably the pressure transmitter is retracted during the infusion phase so as not to impede the flow of matrix.

Typically the pressure intensifier has an interface surface with a central portion and a pair of peripheral portions which have lower stiffness compared with the central portion.

BRIEF DESCRIPTION OF THE DRAWINGS

Embodiments of the invention will now be described with reference to the accompanying drawings, in which:

FIG. 3 is a cross-sectional view of a first intensifier design;

FIG. 4 is a cross-sectional view of a second intensifier design;

FIG. 5 is a cross-sectional view of a third intensifier design;

FIG. 8 is a graph of autoclave temperature (T) versus time (t).

DETAILED DESCRIPTION OF EMBODIMENT(S)

Figure 1:
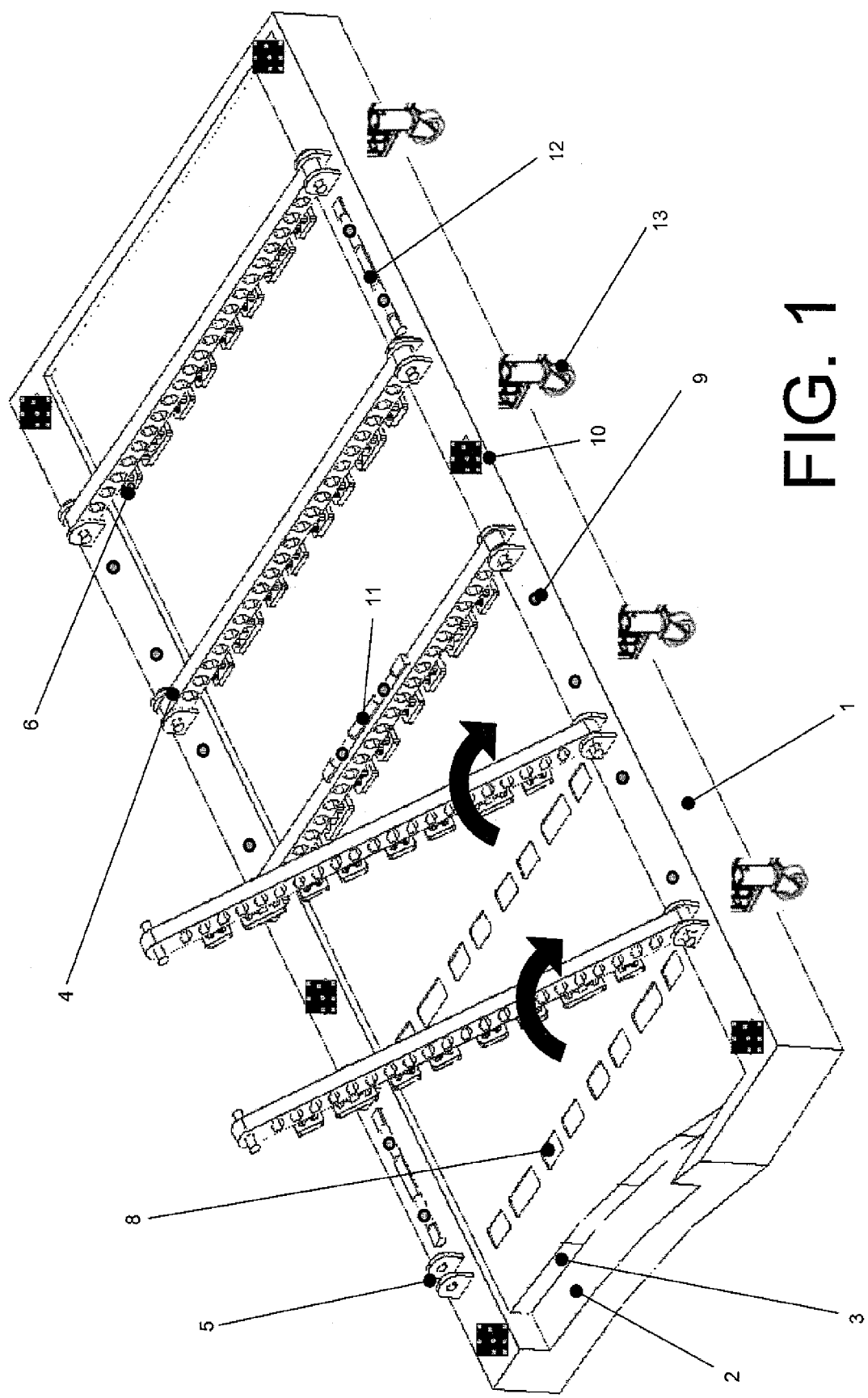
FIG. 1 is a perspective view of the left side of an RFI mould tool.
Figure 2:
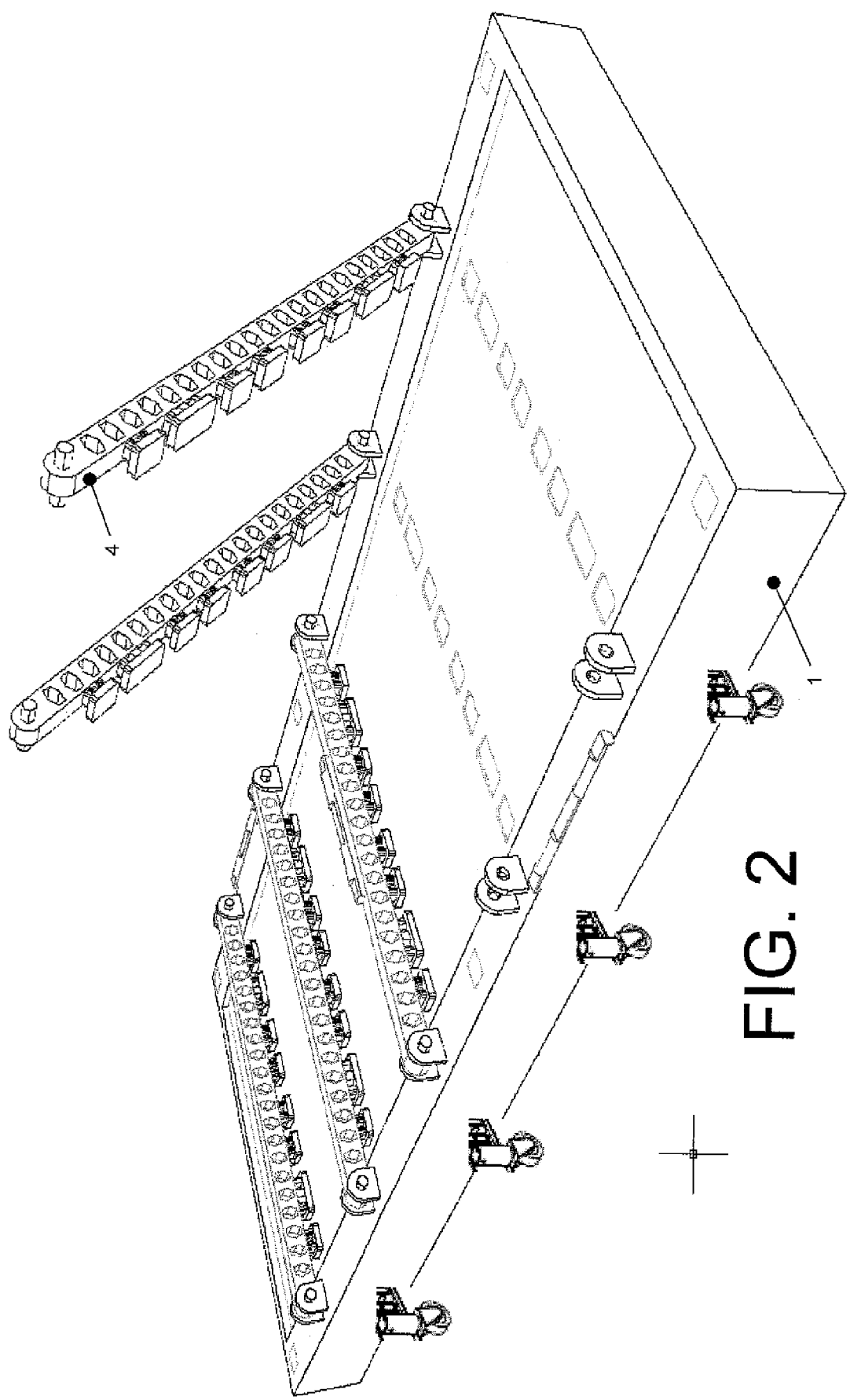
FIG. 2 is a perspective view of the right side of the RFI mould tool.
Figure 6B:
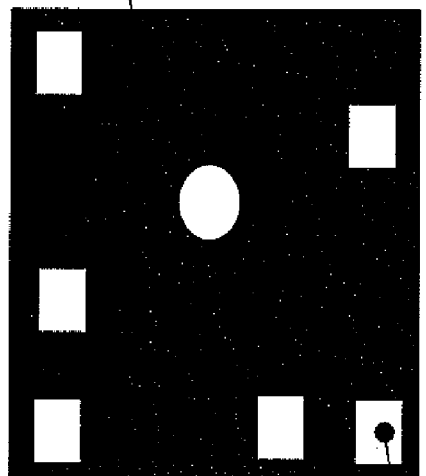
FIG. 6b is a view of a coded target.
Figure 6A:
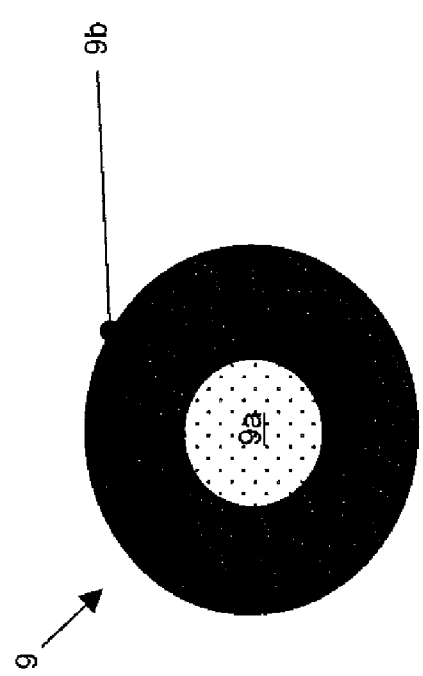
FIG. 6a is a view of a non-coded target.

A resin film infusion mould tool 1 is shown in FIGS. 1 and 2. The mould tool has a mould surface 2 which supports a composite lay-up 3. The lay-up 3 is installed by laying a stack of dry fabric reinforcement layers onto the mould surface 2. The reinforcement layers are typically formed from carbon-fibres, although any kind of reinforcement material may be used including glass-fibres. The mould tool 1 is used to form a wing skin panel, the outer aerodynamic surface of the skin being shaped by the mould surface 2. Although not shown in FIGS. 1 and 2, stringers are attached to the inner surface of the skin running in the spanwise direction, and ramps are formed to increase the thickness of the skin in selected areas.

After the lay-up 3 has been formed on the mould tool, it is "bagged" in preparation for infusion and curing, by laying a vacuum bag (not shown) on top of the lay-up.

A set of tooling beams 4 is pivotally mounted to the mould tool as shown. During lay-up and bagging, the beams 4 are in the raised position illustrated by the two left-hand beams in FIG. 1. Each beam 4 carries a line of intensifiers 6, each applying pressure to a respective interface region 8 of the lay-up.

After the lay-up 3 has been bagged, the beams 4 are lowered to the position illustrated by the three right-hand beams in FIG. 1, and locked in place by locking joints 5.

Three varieties of intensifier 6 are illustrated in FIGS. 3-6. Note that the vacuum bag is omitted from FIGS. 3-6 for purposes of clarity.

The intensifier 6a shown in FIG. 3 is used to control the thickness of interface regions 8 where no ramp or stringer is present. The intensifier 6a includes a thermal actuator comprising a coil 20a embedded in a thermal expansion layer 21a. The thermal actuator is coupled to a pressure transmitter 23a having a pair of dampers 24a fitted round the peripheral edge of its lower interface surface. A thermal insulation layer 23a is fitted to thermally insulate the pressure transmitter 23a from the thermal expansion layer 21a.

The coil 20a is connected to an actuator control system 46 (shown in FIG. 7) by a cable 25a. When current is passed through the coil 20a, it heats up and causes the thermal expansion layer 21a to expand, pressing the pressure transmitter 23a against the composite lay-up 3 (via the vacuum bag). The dampers 24a are formed from a foam material with a lower stiffness compared with the central portion of the interface surface of the pressure transmitter 23a. The dampers 24a compress to reduce fibre distortion and resin wave formation in the lay-up.

The intensifier 6b shown in FIG. 4 is similar in general form to the intensifier 6a, and similar components are given equivalent reference numerals. In contrast to the flat pressure transmitter 23a, the pressure transmitter 23b is profiled so as to mate with a stringer 26 on the surface of the lay-up 3.

The intensifier 6c shown in FIG. 5 is similar in general form to the intensifiers 6a and 6b, and similar components are given equivalent reference numerals. In this case the pressure transmitter 23c is mounted to the beam 4 on a pivot 27, and a pair of thermal actuators are provided, one on each side of the pivot 27. The thermal actuators each include a rotation tool 28 which provides a rolling interface between the thermal actuator and the pressure transmitter 23c. The thermal actuators can be driven together to move the pressure transmitter up and down, or driven differentially to rotate it. FIG. 5 shows the intensifier 6c engaging a ramp section 29 of the lay-up 3.

Photogrammetry targets are applied to the mould tool 1 as shown in FIG. 1, and to the pressure transmitter parts of the intensifiers 6 as shown in FIGS. 3-5. The targets are attached by adhesive. An exemplary pair of such targets is labelled 9,10 in FIG. 1, and shown in detail in FIGS. 6a and 6b. The target 9 is a non-coded target with a photo-reflective circle 9a printed on a contrasting black background 9b. The target 10 is a coded target with a set of photo-reflective markers 10a printed on a contrasting black background 10b. The number and positions of the markers 10a can be read to provide a code which is unique to the target 10, in a similar manner to a two-dimensional barcode. Suitable targets are available as part of the V-STARS™ system provided by Geodetic Systems, Inc. of Melbourne Fla., U.S.A.

As shown in FIG. 1, coded and non-coded targets are applied at selected datum locations along the two sides of the mould tool 1. Although the coded targets are shown presenting the same code in FIG. 1, in practice the coded targets will each present a different code. Calibration bars 11,12 are also mounted on the mould tool and one of the beams 4. Each calibration bar 11,12 carries a pair of non-coded targets, the gap between the targets being accurately known to provide a datum length.

As shown in FIGS. 3-5, non-coded targets 30a-30c are also applied to the pressure transmitters 23a-23c to provide measurement points for the photogrammetry system.

After the beams 4 are locked in place, the tool 1 is wheeled into an autoclave chamber 40 (shown in FIG. 7) on wheels 13 (shown in FIGS. 1 and 2). The lay-up 3 is then infused and cured whilst heating the chamber 40 as described below with reference to FIG. 8 using a heating system 47. The pressure in the autoclave can be increased by introducing Nitrogen into the chamber, to compress the lay-up hydrostatically. A vacuum system 41 is also provided to evacuate one side of the vacuum bag. Additional pressure can also be applied in the discrete interface regions 8 by the array of intensifiers 6. Resin is injected into the lay-up during the cure cycle by a resin injection system 48.

Figure 7:
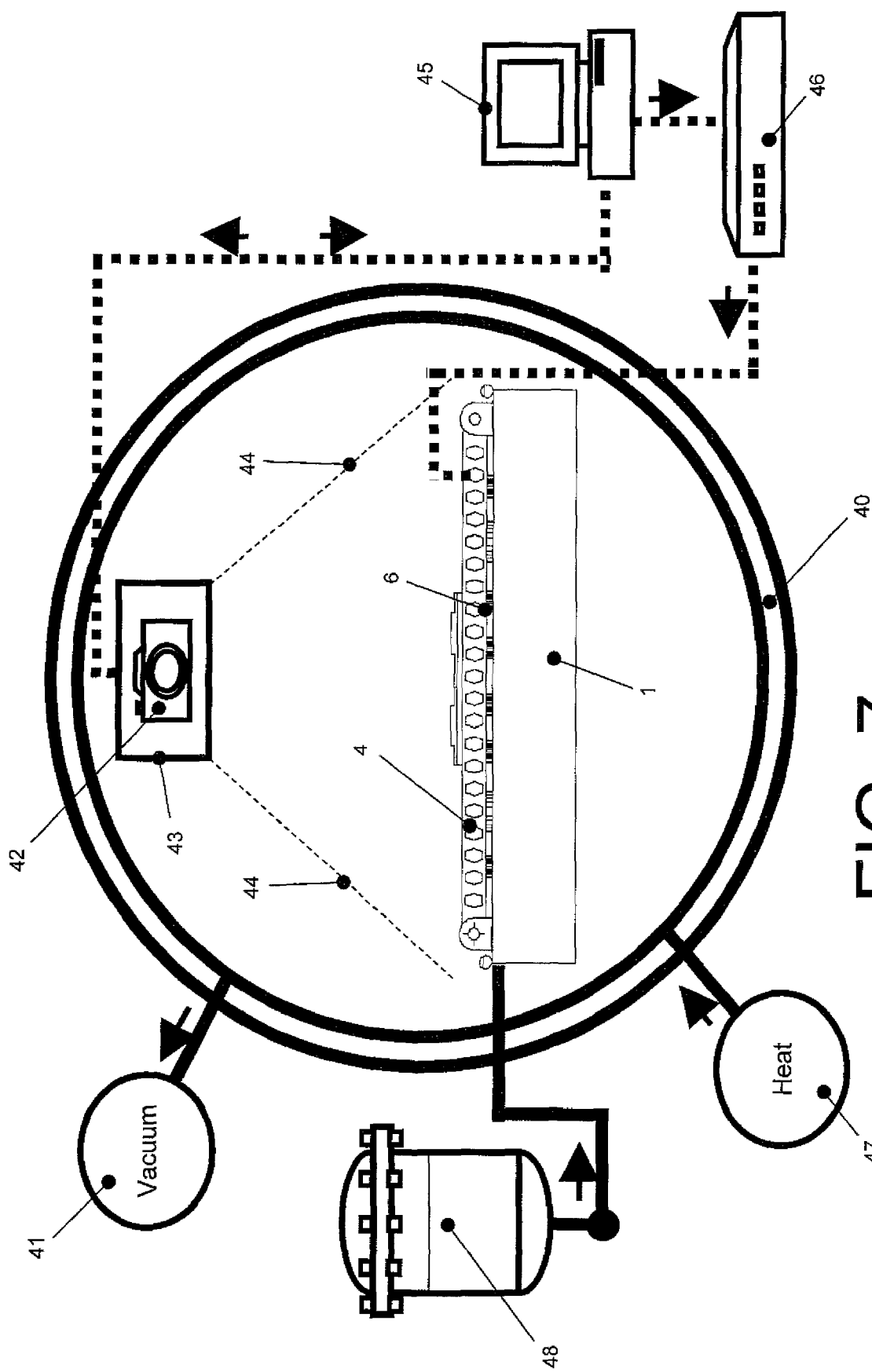
FIG. 7 is a schematic view of the mould tool in an autoclave incorporating a photogrammetry system.

A photogrammetry system shown in FIG. 7 is used to measure the relative position between the mould tool 1 and the intensifiers 6 during the cure cycle. The photogrammetry system may be for example the V-STARS™ system provided by Geodetic Systems, Inc. of Melbourne Fla., U.S.A. See http://www.geodetic.com/v-stars/info.asp?whatis for a detailed description of the principles of operation of the system.

The photogrammetry system comprises a set of photogrammetry cameras mounted in the autoclave chamber 40, and a photogrammetry control system 45 outside the chamber 40. One of such cameras is shown at 42 in FIG. 7, and additional cameras will be provided along the length of the chamber 40. Each camera 42 is mounted inside a sealed and insulated chamber 43 to protect the camera from the effects of heat and temperature. Each camera 42 includes a flash light (not shown) which can be actuated by the control system 45 to illuminate a field of view with white light. The field of view of the camera 42 is shown by dashed lines 44 in FIG. 7. Each camera 42 takes a photographic image of its respective field of view, and the images are transmitted to the control system 45 for processing.

The system 45 identifies images of the photogrammetry targets on the mould tool 1 and the intensifiers 6, and due to the different viewing angles of the cameras the control system 45 can deduce by a process of triangulation the XYZ coordinates of the targets on the intensifiers relative to datum positions defined by the targets on the mould tool. Once the relative positions of the targets are known, the spacing between the mould tool 1 and each intensifier 6 can be deduced to generate a feedback signal for each intensifier. The control system 45 uses the codes on the coded targets 10 to identify the targets in each camera's field of view, and uses the calibration bars 11,12 to provide scale to the images. The feedback signals are then fed to an actuator control system 46 which is configured to independently move each intensifier as shown in FIG. 8 in response to a change in its respective feedback signal, so as to accurately control the thickness of the skin in the interface regions 8. In other words, each intensifier is moved up if the feedback signal indicates that the spacing is too small (compared to a desired spacing), and moves each intensifier down if the spacing is too large.

FIG. 8 is a plot of autoclave temperature (T) versus time (t). During an initial heating phase 50 the chamber is heated up to an infusion temperature 51, and air is removed from the dry fabric by the vacuum system 41. During the initial heating phase 50, the intensifiers 6 are in a retracted position shown in FIG. 8 in which there is a gap 58 between the pressure transmitter and the vacuum bag.

During an infusion phase 52, the intensifiers remain in their retracted positions, and epoxy resin is injected between the mould tool and the vacuum bag by the resin injection system 48. The resin is injected by the resin injection system 48 from one side of the mould tool 1 and drawn from the other by the vacuum system 41. By keeping the intensifiers in their retracted positions during infusion, the resin can flow without being impeded. At the end 53 of the infusion phase 52, infusion of the lay-up is complete and the intensifiers are driven down to apply pressure as shown at 59.

During a second heating phase 54 the chamber is heated up to a cure temperature 55 of approximately 180° C. During the second heating phase 54 and curing phase 56 the feedback signals from photogrammetry control system 45 are fed to the actuator control system 46, which moves each intensifier up and/or down as shown at 60 to maintain a desired spacing between the mould tool and the intensifier (and hence control the thickness of the part in a respective interface region 8).

During a cool-down phase 57 the intensifiers may be held in place, or retracted as shown at 61.

After curing, the skin is used in the assembly of a wingbox: a pair of such skins forming upper and lower surfaces of the wingbox, and a series of ribs running chordwise across the wingbox and attached to the upper and lower skins by rib feet. In the mould tool shown in FIGS. 1 and 2, the interface regions 8 are relatively small regions of the skin which interface with the rib feet. However, similar pressure intensifiers may also be used to control the thickness of other key interface regions which may be larger, such as the interface with a gear rib near the root end of the wingbox. The thickness of the skin between the interface regions is less critical, so there is no need for it to be so tightly controlled.

In the embodiment described above, a single continuous vacuum bag is laid between the pressure transmitters and the lay-up, so the pressure transmitters do not engage the lay-up directly. This is not considered to present a problem, because the thickness of the vacuum bag can be controlled relatively accurately. In an alternative embodiment (not shown) the vacuum bag may have an array of holes, each sealing around the edge of a respective pressure transmitter. In this case, the pressure transmitters will engage the lay-up directly. In a further alternative (not shown) the vacuum bag may be laid over the beams after they have been lowered. Again, in this case the pressure transmitters will engage the lay-up directly.

In the embodiment described above, the lay-up 3 consists of a stack of dry fibre layers only. In an alternative embodiment, the dry fibre layers may be interleaved with semi-solid epoxy resin films which melt and flow into the air-free fabric layers when the infusion temperature is reached. This ensures that no resin-free voids are present after infusion.

Where resin films are provided in the lay-up, additional resin may or may not be injected during the infusion phase.

Although the photogrammetry control system 45 and actuator control system 46 are illustrated in FIG. 7 as separate hardware units, it will be appreciated that the functions of the two systems may be implemented in software by a single unit.

Although the invention has been described above with reference to one or more preferred embodiments, it will be appreciated that various changes or modifications may be made without departing from the scope of the invention as defined in the appended claims.

The invention claimed is:

1. A method of controlling the geometry of a composite component, the method comprising applying pressure to the component with a pressure transmitter, and during said application of pressure:
   heating the component;
   measuring the position of the pressure transmitter during said heating step to produce a feedback signal; and
   moving the pressure transmitter during said heating step in response to a change in the feedback signal and controlling said geometry of said composite component.

2. The method of claim 1 further comprising the steps of:
   engaging the component with a mould tool; and
   measuring the relative position between the mould tool and the pressure transmitter to produce the feedback signal, wherein said moving step maintains a desired spacing between said mould tool and said pressure transmitter.

3. The method of claim 1 wherein the feedback signal is produced by taking photographic images of the pressure transmitter from two or more different angles, and processing the images.

4. The method of claim 3 wherein the processing step includes identifying images of one or more targets on the pressure transmitter.

5. The method of claim 4 further comprising applying the targets to the pressure transmitter.

6. The method of claim 1 comprising simultaneously applying pressure to the component with two or more pressure transmitters, and during said application of pressure:
   measuring the position of each of said pressure transmitters during said heating step to produce corresponding feedback signals, each feedback signal associated with a respective pressure transmitter; and
   moving said two or more pressure transmitters during said heating step in response to a change in their respective feedback signals.

7. The method of claim 1 further comprising laying a vacuum bag onto the component, and evacuating one side of the vacuum bag.

8. The method of claim 1 wherein the pressure transmitter is moved by heating the pressure transmitter.

9. The method of claim 1 wherein the pressure transmitter is rotated in response to a change in the feedback signal.

10. The method of claim 1 wherein the pressure transmitter is moved along a substantially straight path in response to a change in the feedback signal.

11. The method of claim 1 wherein the component is a thermosetting component.

12. The method of claim 1 wherein the component is a fibre-reinforced composite component.

13. The method of claim 1 wherein the component is an aircraft skin panel.

14. The method of claim 1 wherein the component comprises a stack of layers of reinforcement material.

15. The method of claim 1 further comprising injecting the component with a liquid matrix during an infusion phase.

16. The method of claim 15 wherein the pressure transmitter is retracted during the infusion phase.

* * * * *